United States Patent [19]

Shimizu et al.

[11] Patent Number: 5,325,245
[45] Date of Patent: Jun. 28, 1994

[54] METHOD AND APPARATUS FOR WRITING MAGNETIC HEAD POSITIONING SIGNAL

[75] Inventors: Jyousei Shimizu; Jun Naruse; Tsuyoshi Takahashi; Yuji Nishimura, all of Odawara, Japan

[73] Assignee: Hitachi, Ltd., Tokyo, Japan

[21] Appl. No.: 849,522

[22] Filed: Mar. 11, 1992

[30] Foreign Application Priority Data

Mar. 12, 1991 [JP] Japan ................... 3-046715

[51] Int. Cl.5 .............................................. G11B 5/596
[52] U.S. Cl. ............................... 360/77.08; 360/77.11
[58] Field of Search ............... 360/77.02, 77.04, 77.05, 360/77.07, 77.08, 77.11

[56] References Cited

U.S. PATENT DOCUMENTS

| 4,371,902 | 2/1983 | Baxter et al. | 360/77.03 |
| 4,371,960 | 2/1983 | Kroiss | 360/77.04 |
| 4,531,167 | 7/1985 | Berger | 360/77.08 |
| 4,982,295 | 1/1991 | Yakuwa et al. | 360/77.04 |

FOREIGN PATENT DOCUMENTS 64-48275 2/1989 Japan.

Primary Examiner—Louis J. Casaregola
Attorney, Agent, or Firm—Kenyon & Kenyon

[57] ABSTRACT

In a magnetic disk apparatus, a head positioning signal is written on a magnetic disk, the written positioning signal is read out, the read positioning signal is demodulated to produce a position signal, and a data write/read head is positioned to a predetermined track in responses to the produced position signal. A head positioning signal is written into write tracks adjacent to each other along a radial direction of the magnetic head, the positioning signal is read out by tracing a read track bridging the write tracks, and a positioning error of the head positioning signal is generated from a shift of the read positioning signal with respect to the read track. Furthermore, the position signal is over-written by actuating the write head in the radial direction according to the positioning error.

13 Claims, 9 Drawing Sheets

GAIN
(MOVEMENT AMOUNT/
APPLIED VOLTAGE)

PHASE DIFFERENCE
(MOVEMENT AMOUNT/
APPLIED VOLTAGE)

METHOD AND APPARATUS FOR WRITING MAGNETIC HEAD POSITIONING SIGNAL

BACKGROUND OF THE INVENTION

The present invention generally relates to a method for writing a magnetic head positioning signal into a magnetic disk, and also to an apparatus capable of writing a magnetic head positioning signal to a magnetic disk. More specifically, the present invention is directed to a method for writing a magnetic head positioning signal, to a writing apparatus thereof, and to a positioning-signal write head, and furthermore to a magnetic disk apparatus (HDA) containing a magnetic disk manufactured by the above-described method, which are suitable for canceling a positioning error caused by an unequal thickness of a magnetic film of a magnetic disk, and also by an unbalanced distribution of magnetic powder contained in the magnetic film.

A conventional apparatus for writing a magnetic head positioning signal employed in a conventional magnetic disk apparatus utilizes a laser length measuring machine or the like as a position detector and also utilizes a positioning control system in which a voice coil motor (hereinafter referred to as a "VCM") is used as a drive source. Thus, a positioning-signal write/read head is positioned to a predetermined position on a radius of the magnetic disk, and then the positioning signals are then sequentially written on the respective tracks of the magnetic disk in a unit of one track from an outer diameter side thereof As a consequence, the positioning errors are contained in the positioning signal, which are synchronized with rotations of the magnetic disk and caused by an unequal (uneven) thickness of a magnetic film due to a surface shape of a magnetic disk substrate, and by an unequal distribution of magnetic powder contained in the magnetic film.

A description will now be made of the above-described positioning error contained in the positioning signal in more detail FIG. 1 represents a magnetic disk plane for writing a positioning signal. The positioning signal is over-written into write tracks W(n−1), W(n), W(n+1), W(n+2) and so on by the positioning-signal write unit 4g (see FIG. 6) of the head slider part of the magnetic head. Subsequently, the positioning-signal read unit 4f of the head slider part of the magnetic head is sequentially positioned onto read tracks R(n−2), R(n−1), R(n), R(n+1) and R(n+2), whereby the positioning signals written on the magnetic disk in a coaxial form are sequentially read out. It should be noted, as shown in FIG. 1, that the write tracks W(n−1), W(n), W(n+1) and W(n+2) are positionally and mutually shifted with respect to the read tracks R(n−2), R(n−1), R(n), R(n+1) and R(n+2) by ½ track pitch As a result, assuming now that the positioning-signal read unit 4f is positioned to the read track Rn, this positioning-signal read unit 4f reads out the positioning signals which have been written on both of the write track Wn and the write track W(n+1), a position signal proportional to a difference in the signals output from both of these write tracks, is formed by a demodulator (not shown), and then a plurality of magnetic heads (not shown) are positioned to predetermined tracks in response to this position signal FIG. 2 is a sectional view of the magnetic disk plane shown in FIG. 1, taken along a line II—II illustrated in FIG. 1. As represented in the drawing, the positioning-signal read unit 4f is floated on the write tracks Wn and W(n+1) (on the read track R(n)) this is. Since the positioning signals written into the write tracks W(n) and W(n+1) are brought into a saturation writing state, the outputs thereof are directly proportional to both a thickness of a magnetic film at the write tracks W(n) and W(n+1) under the positioning-signal read unit 4f, and the amount of magnetic powder contained in the magnetic film. It should be noted that the thickness of the magnetic film 2d is varied in accordance with surface machining precision of the magnetic disk substrate 2c, whereas the amount of magnetic powder (indicated by a dot in FIG. 2) is changed, depending upon the unequal distribution.

Referring now to FIG. 3, a description will be made of adverse influences caused by the unequal thickness of the magnetic film and also the unequal distribution of the magnetic powder, and also given to the positioning signals It should be noted that FIG. 3 only represents the vibration components of the position signals in synchronism with the rotation of the magnetic disk. In FIG. 3, an ordinate is indicated by a value which is obtained by converting the vibration component of the position signal into the positioning error amount, whereas an abscissa is indicated by a rotation angle of the magnetic disk It should be understood that the position signal shown in FIG. 3 corresponds to the output of the position signal when the positioning-signal read unit 4 is positioned over the read track R(n) shown in FIG. 1, and the vibrations of the position signal corresponding to the head travel distance of about 3 μm happen to occur, due to the unequal thickness of the magnetic film and the unequal distribution of the magnetic powder contained therein Since the vibrations of the position signal are caused by the unequal thickness of the magnetic film of the magnetic disk and also the unequal distribution of the magnetic powder contained therein, the vibrations are synchronized with the rotation of the magnetic disk.

With respect to such vibrations of the position signal caused by the uneven distribution of the magnetic powder contained in the magnetic film, the conventional writing apparatus employs the following measurement. That is to say, after the positioning signals have been written into the entire plane of the magnetic disk, the positioning signals are read out by the read head and demodulated to obtain position signals Then, amplitudes of the vibrations of the position signals are measured, and also the track pitches are measured If the measurement results exceed the specification values, the positioning signals are rewritten in the same manner, or the present magnetic disk is replaced by a new magnetic disk for rewriting the positioning signals thereto Also, various improvements have been performed in the surface machining precision of the magnetic disk substrate so that the thickness of the magnetic film could be uniformly made and the distribution of the magnetic powder contained in the magnetic film could be equally made, whereby the vibrations of the position signals could be improved Heretofore, the positioning errors which are caused by the unequal distribution of the magnetic powder contained in the magnetic film and also are synchronized with the rotation of the magnetic disk, are smaller than the track pitch for recording the data Also the adverse influences by these positioning errors and given to the positioning precision on the data write/read (R/W) head, are relatively low. However, there is a problem in the adjustments or corrections of the positioning errors which are synchronized with the rotation of the magnetic disk, since the track pitches become narrower due to high data recording density.

The above-described conventional positioning-signal write method and apparatus are known from, for example, JP-A-64-48276, which describes a measurement for preventing the vibrations of the magnetic disk caused by the mechanical rotation vibrations of the rotating mechanism for rotating the magnetic disk.

As previously described in the prior art, no care is taken into the positioning errors which are caused by the unequal thickness of the magnetic film of the magnetic disk substrate and the unequal distribution of the magnetic powder contained in the magnetic film and also are synchronized with the rotation of the magnetic disk As a consequence, when the data recording track pitches are narrowed in accordance with an increased recording capacity of the magnetic disk recording apparatus, the above-described positioning errors synchronized with the magnetic disk may cause a large adverse influence to the positioning precision of the data write/read head, and therefore may impede the high data recording density.

Moreover, the above-explained conventional improvements in achieving the uniform thickness of the magnetic film and also the uniform distribution of the magnetic powder contained in the magnetic film, due to the surface machining precision of the magnetic disk substrate, will induce a high cost. Additionally, since there is a limitation in the surface machining precision of the magnetic disk substrate, such a conventional surface machining precision does not improve the positioning precision required for the high data recording density.

SUMMARY OF THE INVENTION

The present invention solves the above-described conventional problems, and therefore relates to a method and an apparatus for writing a magnetic head positioning signal, and a positioning-signal write head and also a magnetic disk apparatus employing these apparatuses, suitable for canceling the positioning errors in synchronism with the rotation of the magnetic disk to achieve high data recording density.

A method for writing a magnetic head positioning signal, according to the present invention, may be applied to such a magnetic disk apparatus in which a positioning signal is written into a magnetic head, the written positioning signal is read out, the read positioning signal is demodulated to produce a position signal, and a data write/read head is positioned to a predetermined track based upon the produced position signal. In this positioning-signal write method, the positioning signal written into the magnetic disk is read to measure a positioning error contained in the read positioning signal; and the positioning signal is rewritten into the magnetic disk in order that the measured positioning error is canceled Also, a magnetic head positioning-signal write apparatus, according to the present invention, may be applied to a magnetic disk apparatus in which a positioning signal is written into a magnetic head, the written positioning signal is read out, the read positioning signal is demodulated to produce a position signal, and a data write/read head is positioned to a predetermined track based upon the produced position signal. In particular, the positioning-signal write apparatus is featured by comprising a first means for reading the positioning signal written into the magnetic disk to measure a positioning error contained in the read positioning signal; and, a second means for rewriting a positioning signal on the magnetic disk, while controlling the positioning error measured by the first means.

A positioning signal write head according to the present invention includes a means for moving a head slider part along a radial direction of a magnetic disk in accordance with a positioning error contained in a positioning signal read out from the magnetic disk A magnetic disk apparatus, according to the present invention, is characterized in that a positioning signal written into a magnetic disk is read out, a positioning error contained in the read positioning signal is measured, and then a positioning signal is rewritten in order that the measured positioning error is canceled.

In accordance with the present invention, the positioning signal written into the magnetic disk is read out, the positioning signal contained in the read positioning signal is measured, and the positioning signal is rewritten into the magnetic disk, while controlling the movement of the head slider part along the radial direction of the magnetic disk, in order that the measured positioning error can be canceled, so that the positioning error can be cancelled in synchronism with the rotation of the magnetic disk.

DESCRIPTION OF THE PREFERRED EMBODIMENTS

A description will now be made of the present invention in more detail with reference to preferred embodiments shown in the accompanying drawings.

Figure 4:
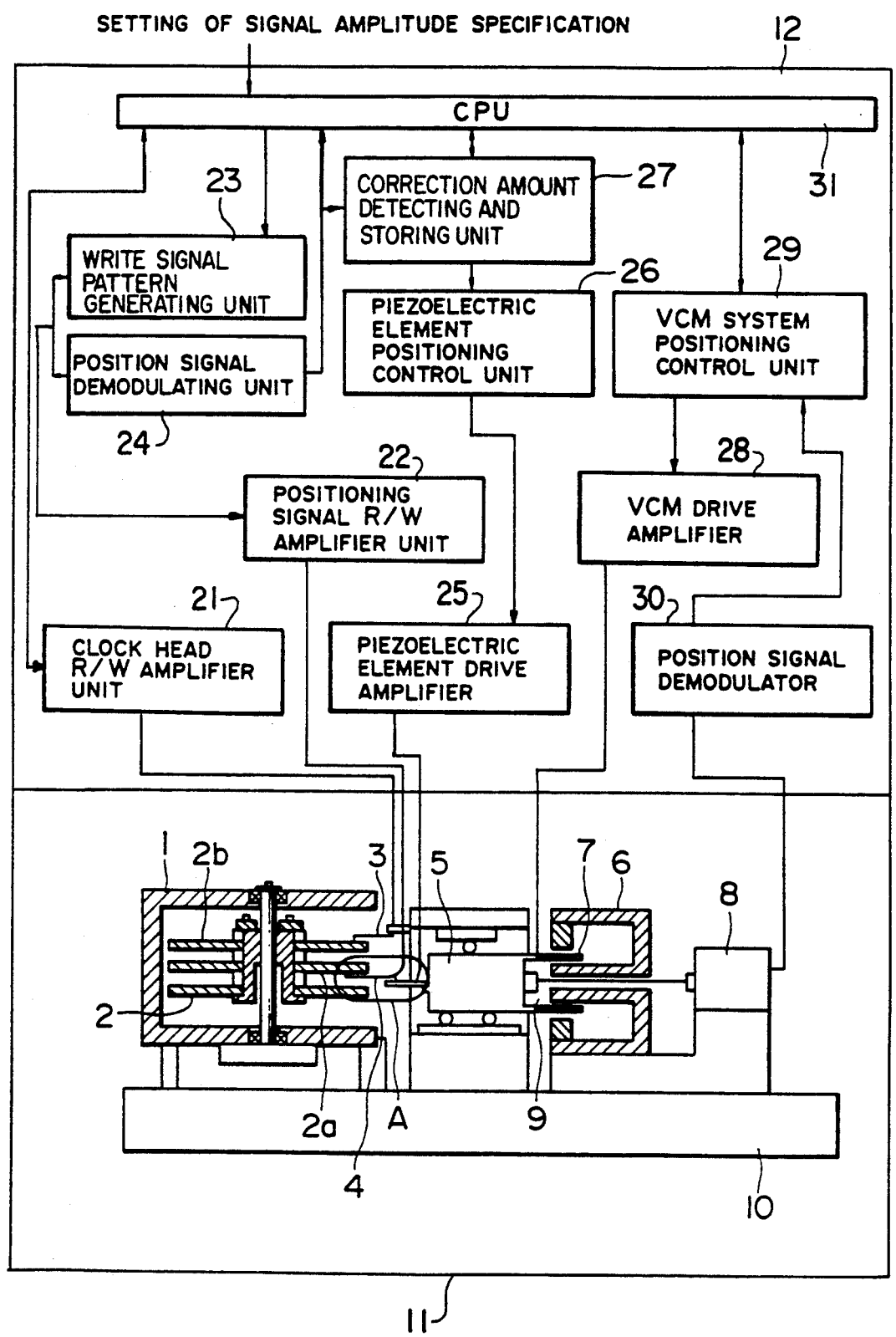
FIG. 4 is a schematic block diagram for showing a construction of a positioning-signal writing apparatus according to a preferred embodiment of the present invention.

FIG. 4 is an explanatory diagram illustrating a positioning-signal writing apparatus according to a preferred embodiment of the present invention The positioning-signal writing apparatus of this preferred embodiment is mainly constructed of a positioning-signal write drive unit 11 and a positioning-signal write control unit 12. In the positioning-signal write drive unit 11, a plurality of magnetic disks 2 are stacked on a base 10, and a magnetic disk rotation drive unit 1 for rotatably supports each of these magnetic disks is. A fixed clock head 3 is mounted on a disk plane 2b of one magnetic disk of the plurality of magnetic disks 2. Furthermore, a positioning-signal write/read head (a positioning-signal R/W head) 4 is mounted on a magnetic disk plane 2a to which the positioning signal is written.

Figure 5:
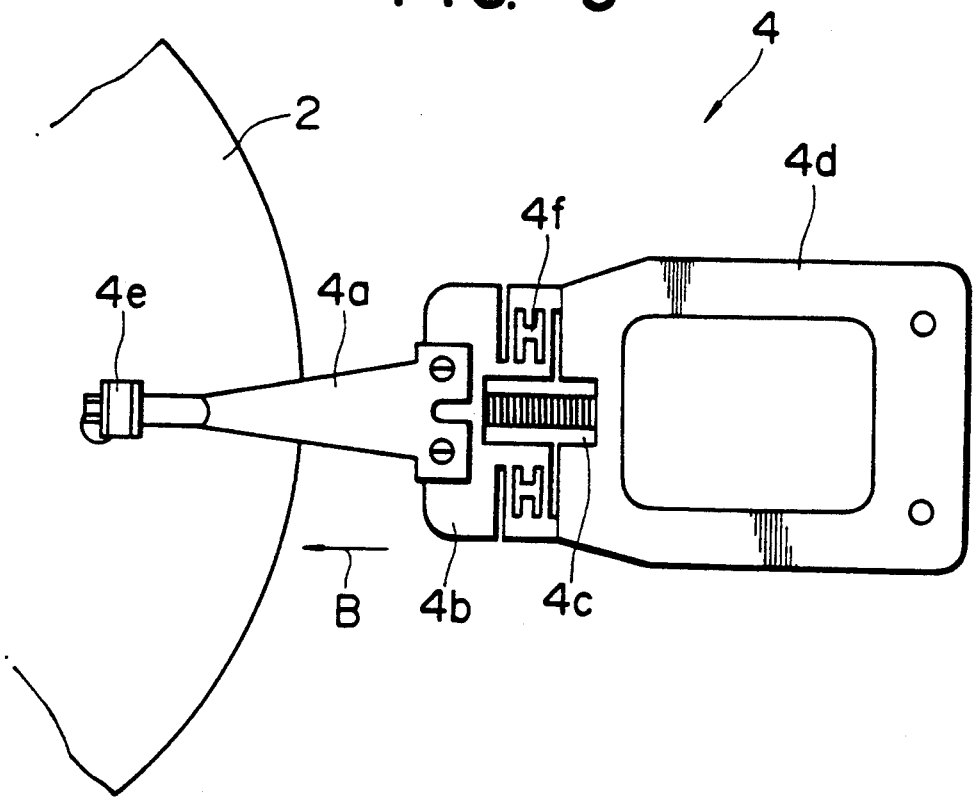
FIG. 5 schematically illustrates a construction of a positioning-signal writing head employed in the construction shown in FIG. 4.

FIG. 5 is an explanatory diagram illustrating one example of the positioning-signal R/W head 4, and corresponds to a part "A" shown in FIG. 4. As shown in FIG. 5, the above-described positioning-signal R/W head 4 includes a head arm 4d, a head subassembly 4a and a head slider part 4e. A piezoelectric element 4c is provided with the head arm 4d of the positioning-signal R/W head 4, and furthermore an H-shaped slit and a straight-shaped slit 4f are provided around the piezoelectric element 4c. The head arm tip portion 4b having such a structure is moved by a very small distance along a direction of an arrow "B" by driving the piezoelectric element 4c by way of a properly employed drive source (not shown). At this time, since the slit 4f has a parallel leaf spring structure, the head arm tip portion 4b can be prevented from being positionally shifted from a direction of an arrow "B".

In other words, a piezoelectric actuator for moving the head tip portion 4b by driving the piezoelectric element 4c along the direction of the arrow "B" is provided with the head arm 4d. Also, the head subassembly 4a is employed at the head arm tip portion 4b. Furthermore, a head slider 4e is mounted on a tip portion of the head subassembly 4a. It should be noted that a movement amount required for canceling a vibration amplitude in synchronization with a rotation may be sufficiently on the order of 10 micrometers.

Figure 6:
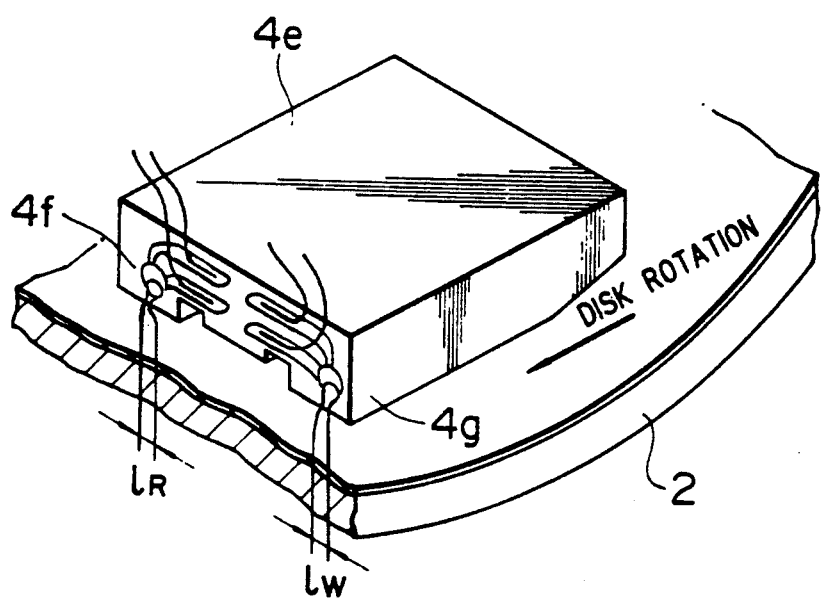
FIG. 6 schematically represents a detailed construction of a head slider part of the positioning-signal writing head shown in FIG. 5.

FIG. 6 is an explanatory diagram illustrating the head slider 4e in more detail As shown in FIG. 6, the head slider 4e is equipped with a positioning-signal writing unit 4g, the head core length of which is equal to "1w", and a positioning-signal reading unit 4g, 4f, the head core length of which is equal to "1r", whereby the positioning signal is written/read.

In FIG. 4, the above-described positioning-signal R/W head 4 is mounted on a carriage 5, and then is driven along a radial direction over the positioning signal writing plane 2a of the magnetic disk 2 by a voice coil motor (VCM) constructed of a coil 7 and a magnetic circuit 6. Furthermore, a laser reflecting mirror 9 is mounted on the carriage 5 and a position of the positioning-signal R/W head 4 is measured by a laser position detector 8. As a consequence, the positioning-signal R/W head 4 may be positioned to a predetermined position on the magnetic disk plane 2a under control of a positioning-signal write control unit 12.

The positioning-signal write control unit 12 is arranged with write control unit 12 comprises a clock head read/write amplifier unit 21 for a clock signal which is read/ written by a fixed clock head 3 and also is used as a basis to write the positioning signal; a read/-write amplifier unit 22 for the positioning signal; a write signal pattern generating unit 23 connected to the read/write amplifier unit 23, for generating the positioning signal; and a position signal demodulating unit 24 for demodulating the position signal based on the positioning signal read out from the magnetic disk Also, illustrated in FIG. 4, a VCM drive amplifier 28 and a laser position signal demodulator 30, and furthermore a VCM positioning system control unit 29 for controlling these units Under control of these control systems, the positioning signal R/W head 4 is positionally controlled while moving this R/W head 4 among the tracks.

Moreover, the positioning-signal write control unit 12 further includes a correction amount detecting/ storing unit 27 for detecting a vibration component in synchronism with the rotation of the magnetic disk in response to the position signal output from the position signal demodulating unit 24, for setting a correction amount to perform a positional correction of the head subassembly 4a while writing the positioning signal, and for storing the correction amount piezoelectric element system positioning control unit 26 and a piezoelectric element drive amplifier 25 are also included in positioning-signal write control unit 12 for moving the head subassembly 4a by a very small distance by way of the piezoelectric element 4c based upon this correction amount. It should be noted that the above-described correction amount detecting/storing unit 27, the piezoelectric element system positioning control unit 26, and the piezoelectric element drive amplifier 25 constitute a very fine movement controlling system of the head subassembly 4a. The overall positioning-signal write control unit 12 is controlled by a CPU (control processing unit) 31.

Figure 7:
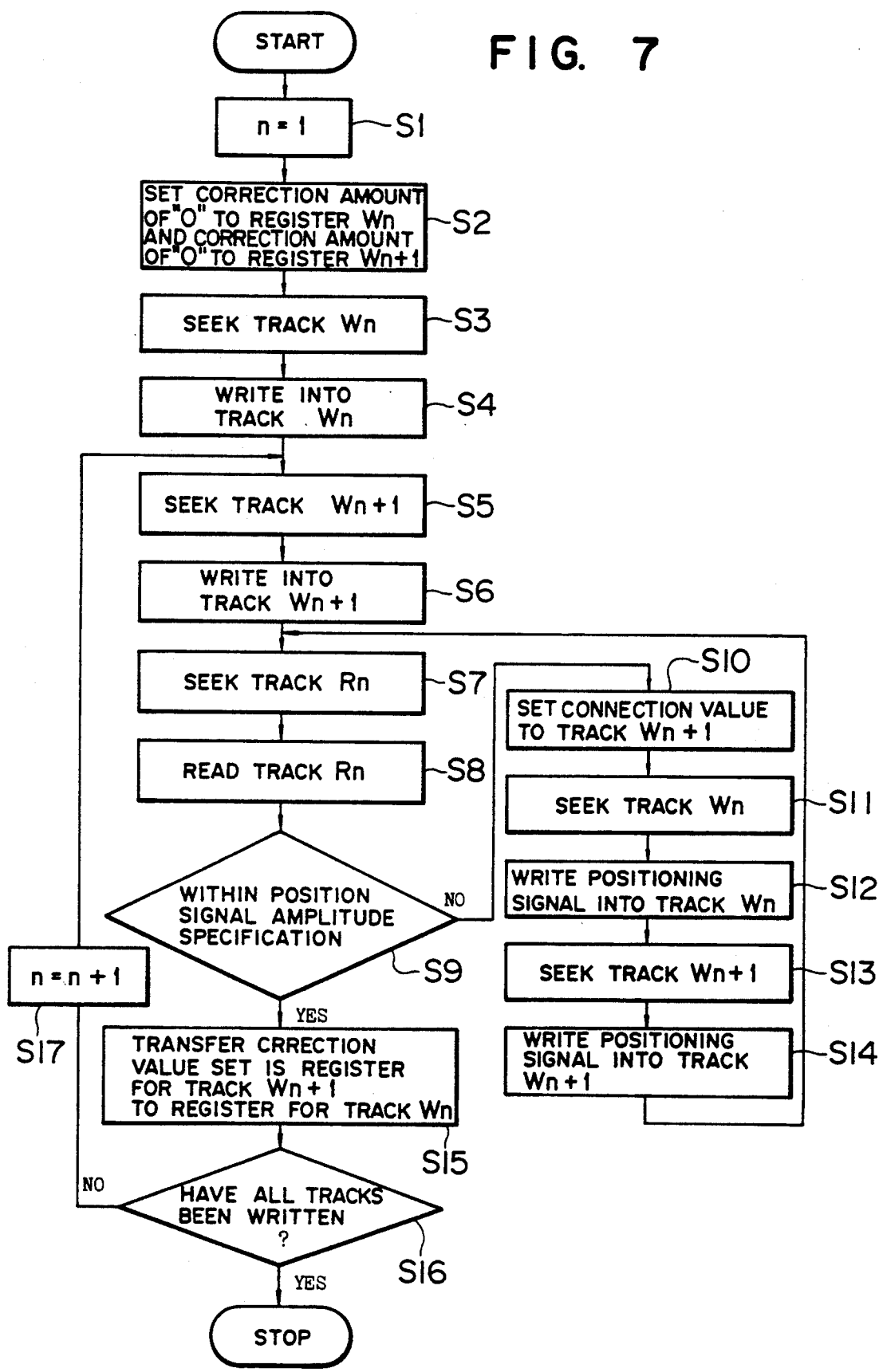
FIG. 7 is a flow chart for explaining an operation of the apparatus shown in FIG. 5.
Figure 8:
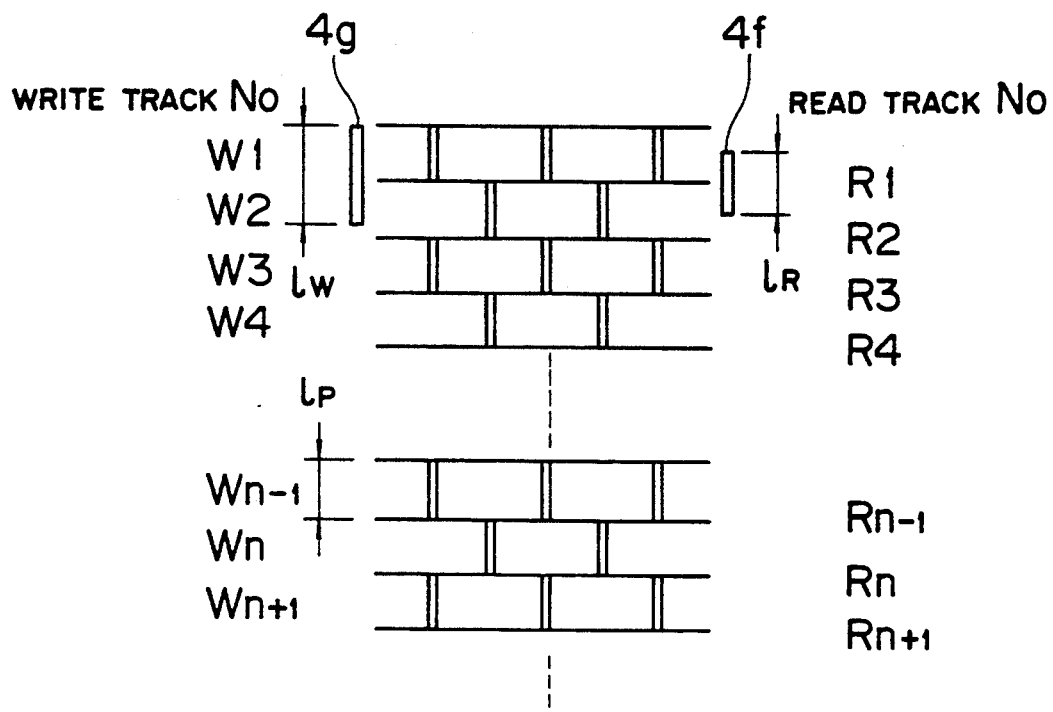
FIG. 8 is an explanatory diagram for showing a relationship between a write track and a read track on a magnetic disk.

An operation of the preferred embodiment shown in FIG. 4 will now be explained with reference to a flow chart represented in FIG. 7. Upon start of the program depicted by the flow chart shown in FIG. 7, a value "n" of a counter is set to an initial value of 1, which is realized as a function within CPU 31 (step S1). Subsequently, a correction amount "0" (initial value for a write track W1 during the write operation is set to a table for a track W(n). Similarly, a correction amount "0" (initial value) for a write track W2 during the write operation is set to a table for a track W(n+1) (step S2). Next, the positioning signal R/W head 4 is sought to a desirable write track W1 in such a manner that both the VCM system positioning control unit 23 and the VCM drive amplifier 28 for the VCM drive system control the coil 7 combined within the magnetic circuit 6 to drive the carriage 5 in response to a seek instruction signal devised from CPU 31. Additionally, the feedback system of the laser reflecting mirror 9, the laser position detector 8 and the position signal demodulator 30 is operated. The present position of the write head core is represented in FIG. 8. Then, in response to a predetermined write instruction signal derived from CPU 31, the write signal pattern generated from the write signal pattern generating unit 23 is supplied via the positioning signal R/W amplifier unit 22 to the positioning signal R/W head 4 in order that the positioning signal is written into the track W1 (step S4). The positioning-signal R/W head 4 is then sought to the write track W2 in a manner similar to the above-described manner (step S5), so that the positioning signal is written into the write track W2 (step S6).

Subsequently, as shown in FIG. 8, a read track R1 is defined above a boundary line between the write tracks W1 and W2, and a seek operation is carried out in order that a center of the read head core is positioned on the read track R1 by means of the above-described VCM drive/feedback system (step S7).

Next, the read track R1 is tracked by the positioning-signal R/W head 4, and the positioning signal is read by the positioning signal R/W amplifier unit 22 and the position signal demodulating unit 24, whereby this positioning signal is demodulated as a position signal which is directly proportional to a shift amount between a boundary line above a detection signal detected by tracking the positioning signal R/W head 4, and a boundary line virtually defined by the write track W1 and the write track W2 (step S8).

Subsequently, the above-described position signals are synchronized with each other with respect to every track by way of the process operation by CPU 31 by employing an index signal from the clock head 3, which is produced once every time the magnetic disk is rotated, and then the position signals are averaged so that only a vibration component in synchronism with the rotation of the magnetic disk is extracted. Thus, a vibration amplitude in synchronism with the rotation of the magnetic disk is measured and a judgement is made whether or not the vibration amplitude is within the specification value (step S9).

When the vibration amplitude value is outside the specification value, the process is advanced to a step S10. At the step S10, the rotation-synchronized vibrations produced in CPU 31 at the previous step S9 are output to the correcting value detecting/storing unit 27, so that the rotation synchronized vibrations are converted by an analog/digital converter (ADC) employed within unit 27 into a corresponding digital value which will then be set into a table for a track W(n+1) as a correction value used when the positioning signal for the track W2 is written. Thereafter, the write head is sought to the track W1 (step S11) to write the positioning signal to the track W1 (step S12). It should be noted that since the correction value of the table for the track Wn is "0" (see the step S2) with respect to the track W1, no correction value is written.

Then, the positioning-signal R/W head 4 is sought to the track W2 (step S13), and the positioning signal is written on the track W2 by applying a voltage directly proportional to the correction value which has been set into the table for the track W(n+1) employed in the correction amount detecting/storing unit 27, via the piezoelectric element system positioning control unit 26 and the piezoelectric element drive amplifier 25 to the piezoelectric element 4c (refer to FIG. 5) provided on the head arm to which the write head is mounted, while the write head is moved along the radial direction of the magnetic disk by driving the piezoelectric element 4c (step S14). The moving direction of the write head may be determined by setting the above-described correction value along such a direction that the positioning error in synchronism with the rotation, which is caused by the magnetic characteristics of the magnetic film of the magnetic disk, is canceled Subsequently, the read head again seeks the read track R1 (step S7), and the positioning signal is read from the track R1 whereby this positioning signal is demodulated as a position signal (step S8). Next, the position signals are averaged and a vibration component being synchronized with the rotation of the magnetic disk is extracted so that in step S9 a judgement is made whether or not the vibration amplitude is within the specification value. If the vibration amplitude is outside the specification value, the process operations defined in the steps S9 to S14 are repeatedly performed in a similar manner. When the vibration amplitude is within the specification value as a result of a judgement in step S9 by CPU 31, the process is advanced to a step S15. In step S15, the correction value which has been set into the table for the track W(n+1) employed in the correction value detecting/storing unit 27, is transferred to the table for the track Wn. Also, "0" has been set into the register for the track W(n+1). Next, a judgement is made in step S16 whether or not the number of positioning-signal write tracks reach all track numbers. If all of the tracks have not yet been written, the process is advanced to a step S17. At the step S17, a value of "1" is added to the count value "n" of the counter. Next, t the process is advanced to step S5 at which the positioning signal is written into the track W3 in order not to produce the positioning error in synchronism with the rotation of the magnetic disk in a similar manner that the positioning signals have been written to the write tracks W1 and W2. When all of the tracks have been written, the process is advanced from the loop of the step S16 to a final step, so that the writing operation of the positioning signal is accomplished.

Figure 1:
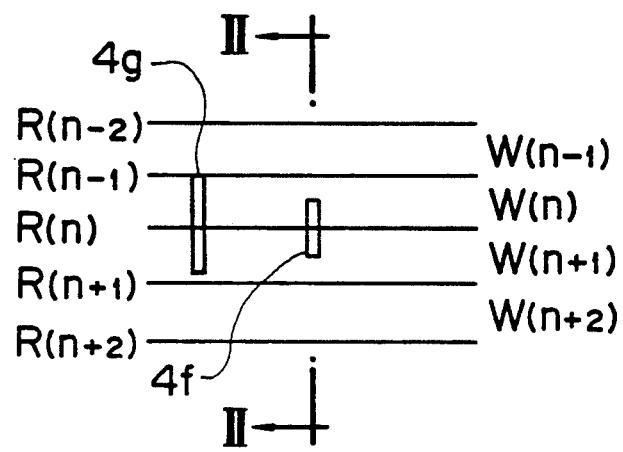
FIG. 1 is an explanatory diagram for representing a relationship between a write track and a read track on a magnetic disk.
Figure 2:
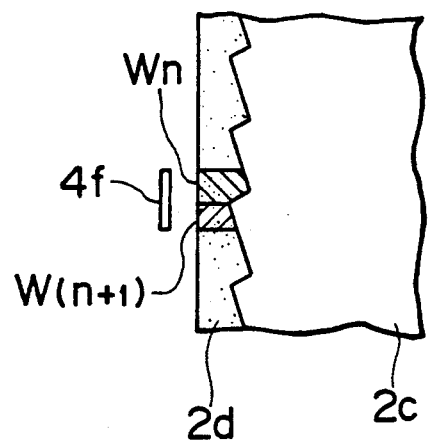
FIG. 2 is a sectional view of the magnetic disk, taken along a line II—II of FIG. 1.
Figure 3:
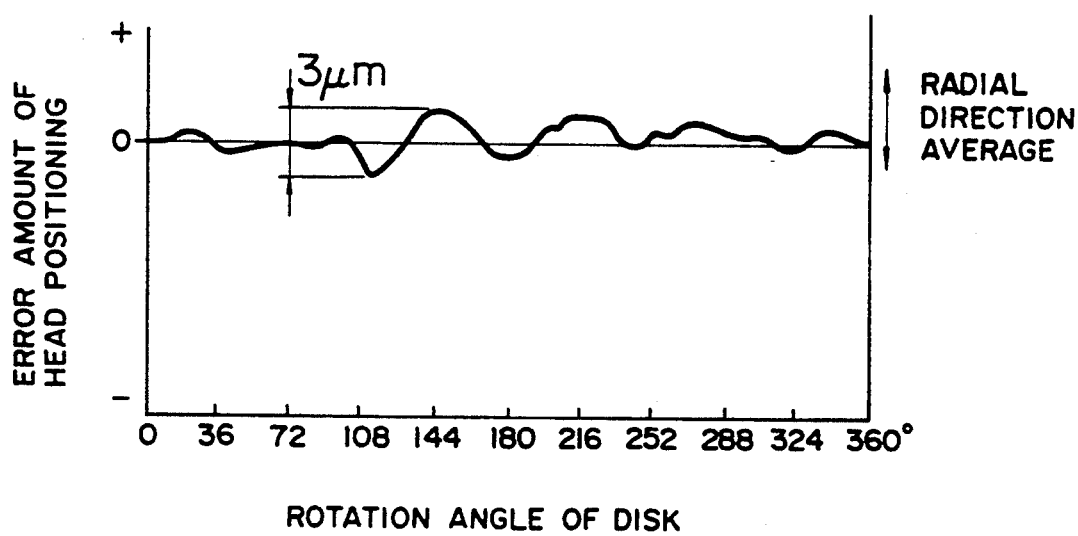
FIG. 3 is a diagram for showing a relationship between a vibration amplitude of a position signal and a rotation angle of a magnetic disk in prior art.
Figure 9:
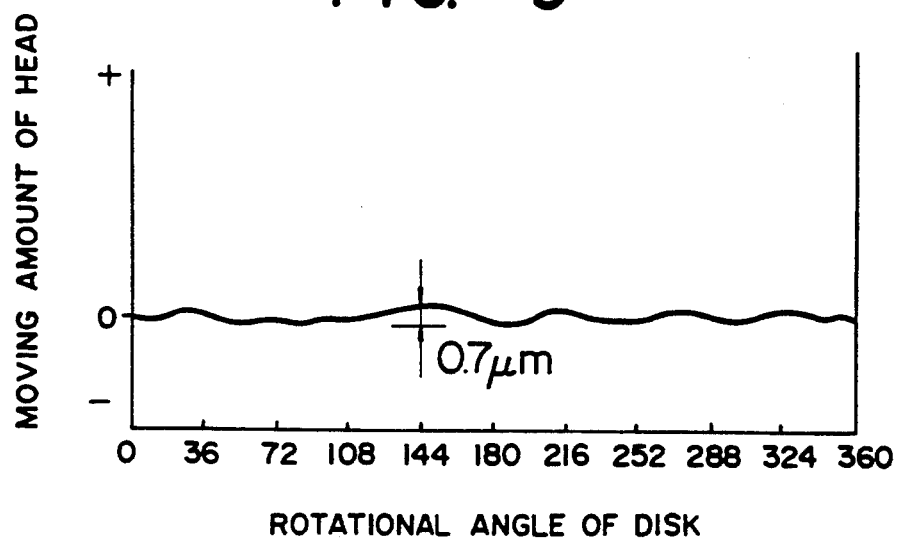
FIG. 9 is an explanatory diagram for representing a relationship between a vibration amplitude of the position signal and a rotation angle of the magnetic disk of the preferred embodiment shown in FIG. 5.

Referring now to FIG. 9, a description will be made of the position signal produced from the magnetic disk into which the positioning signal has been written in accordance with the above-described steps. FIG. 9 only represents the vibration component in synchronism with the rotation of the magnetic disk, which is similar to that shown in FIG. 3. It is apparent from FIG. 9, if the correct write operation of the positioning signal is carried out on the magnetic disk in accordance with the above-described procedure, since the vibration component in synchronism with the rotation of the position signal can be reduced, high density recording can be realized.

In case the magnetic head of the magnetic disk apparatus is moved among the tracks, the movement of this magnetic head is controlled by the velocity control system at the beginning, and then this velocity control system is changed into the positional control system just before the magnetic head reaches a target track. At this time, if the velocity error and the positional error caused when the control system is changed become small, such a control system changing operation may be smoothly performed. Accordingly, there is another advantage that the settling vibration until the magnetic head is positioned to a target track can be reduced and the settling time can be shortened.

Figure 10:
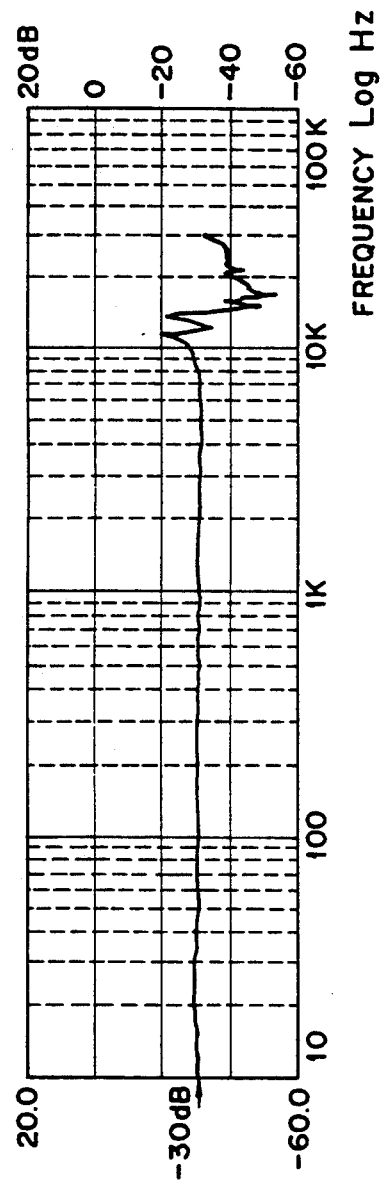
FIG. 10 is a graphic representation of a gain characteristic of the positioning-signal writing head into which a piezoelectric element has been assembled in which an ordinate is indicated by an amplitude ratio (gain) of voltage applied to the piezoelectric element, to a movement amount, whereas an abscissa is indicated by a frequency of applied voltage.

In FIG. 10, such a gain characteristic curve is shown in the positioning-signal write head assembled with the piezoelectric element that an ordinate is indicated by a ratio (gain) of movement amounts to the voltage applied to the piezoelectric element, whereas an abscissa is indicated by frequencies of the applied voltage. In normal, the frequency band required for the magnetic head positioning system of the magnetic disk apparatus is equal to, or lower than several KHz. As a result, as apparent from FIG. 10, the gain becomes constant up to a frequency of approximately 10 KHz, which implies that the positioning-signal write apparatus according to the present invention may be practically utilized up to this frequency band.

Figure 11:
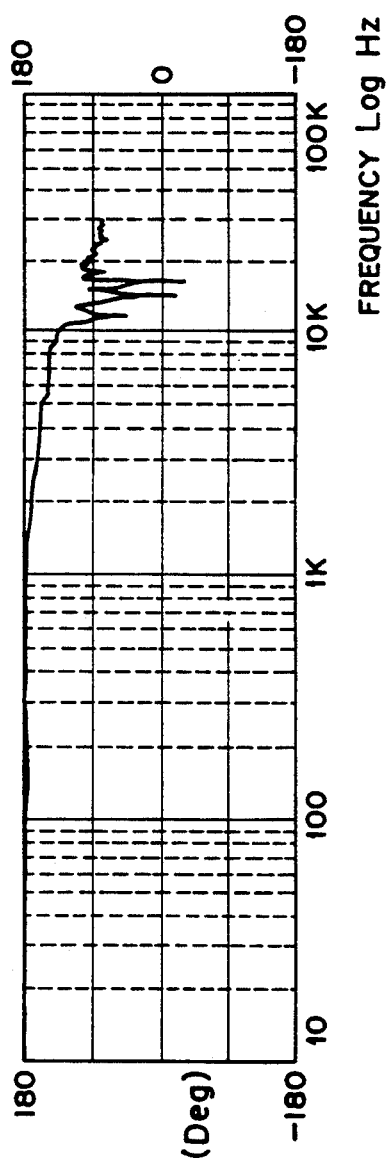
FIG. 11 is a graphic representation of a phase characteristic curve in which an ordinate is expressed by a phase difference between the movement amount and the applied voltage, whereas an abscissa is indicated by a frequency of the applied voltage, similar to that of FIG. 10.

FIG. 11 represents a phase characteristic curve in the positioning-signal write head assembled with the piezoelectric element, in which an ordinate is indicated by a phase difference between a movement amount and an applied voltage, whereas ah abscissa is indicated by a frequency of the applied voltage. As obvious from FIG. 11, the phase difference is constant up to a frequency of about 10 KHz, which implies that the positioning-signal write apparatus according to the present invention may be practically utilized up to this frequency band.

Figure 12:
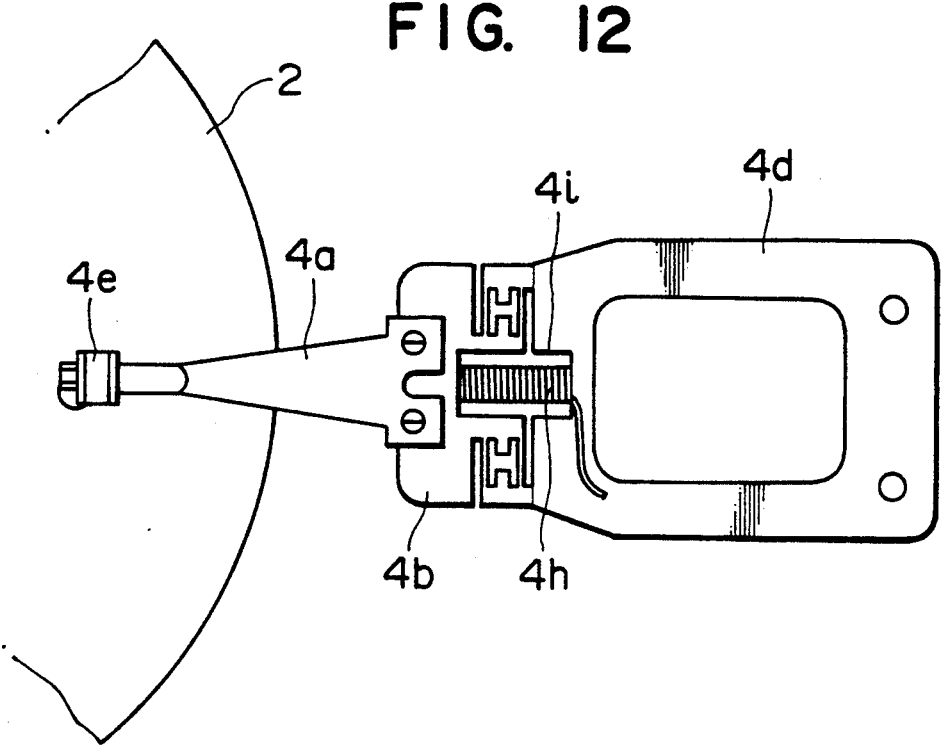
FIGS. 12 and 13 are explanatory diagrams for showing another positioning-signal writing head according to a further embodiment of the present invention; and, FIG. 14 schematically illustrates an example of a magnetic disk apparatus equipped with the magnetic disk into which the positioning-signal has been written by utilizing the positioning-signal writing apparatus shown in FIG. 5.
Figure 13:
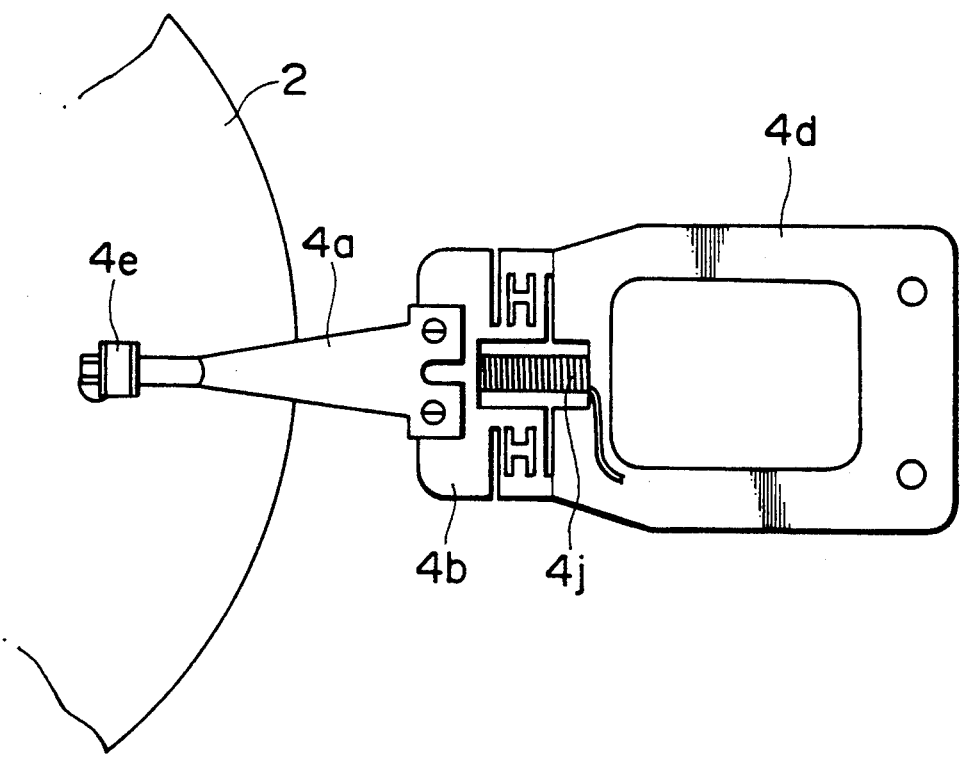

FIGS. 12 and 13, illustrates actuators for positioning-signal write heads according to a further preferred embodiment of the present invention. FIG. 12 represents such an actuator in which a shape memory alloy 4h is heated by a heater to move a head subassembly 4a by a very small distance. FIG. 13 indicates such an actuator in which a bellows 4j is employed and a head subassembly 4a is moved by air pressure or oil pressure by a very small distance.

Figure 14:
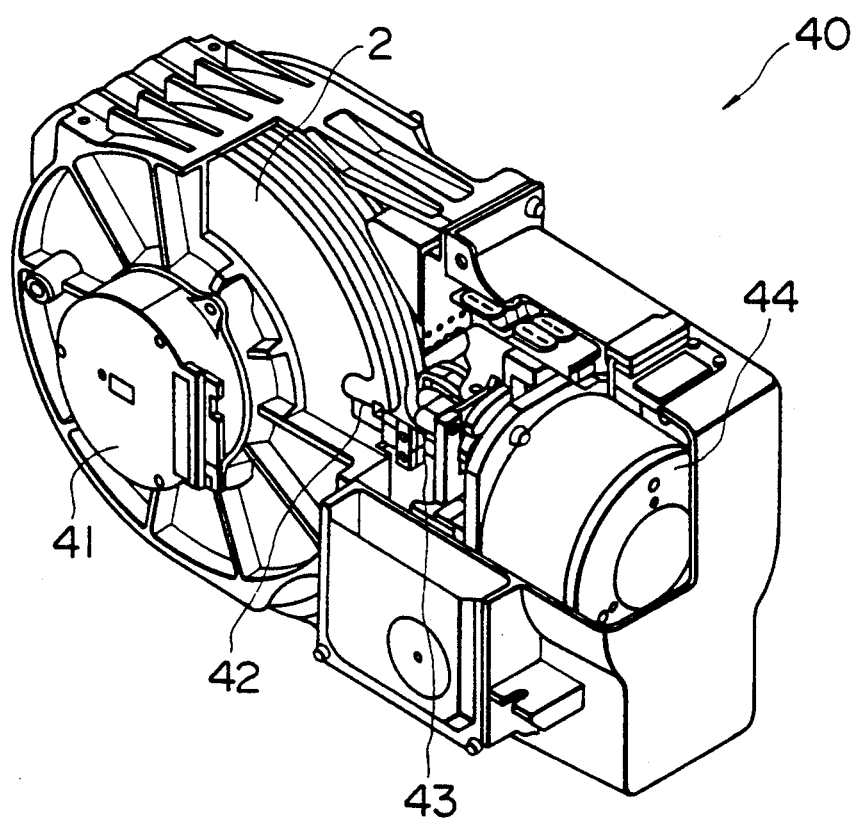

FIG. 14 illustrates an example of a construction in which the magnetic disk 2 into which the head positioning signal has been written by the apparatus of this preferred embodiment, as assembled together with a DC motor 41, a magnetic head 42, an actuator 43 and a magnet 44 for a voice coil as a disk apparatus (HDH) 40.

In accordance with this disk apparatus 40, there is a small positioning error contained in the head positioning signal to the magnetic head 2, and thus it is possible to provide a disk apparatus suitable for high density recording operation.

It should be noted that although such a magnetic disk apparatus equipped with the magnetic disk plane exclusively used to write the positioning signal thereon has been described in the above-explained preferred embodiments, the present invention is not limited thereto. For example, the present invention may be applied to such a magnetic disk apparatus in which both data and positioning signals are written on the same track As apparent from the foregoing descriptions, the following advantages of the preferred embodiments can be obtained. That is to say, since the head positioning precision of the magnetic disk apparatus can be improved in accordance with the preferred embodiment of the present invention, the writing pitch of the data along the radial direction of the magnetic disk can be made smaller than that of the conventional positioning-signal write apparatus, and a large recording capacity can be realized.

When the data write/read head is accessed among the tracks, this head is moved in a long distance under control of the velocity control system, and then the control system is changed into the positional control system just before the head reaches the target track, whereby the data write/read head may be positioned to the target track. It should be noted that the position signal obtained by the preferred embodiment contains a small velocity error (which is produced by differentiating the position signal) and a small positional error caused when the velocity control system is changed into the positional control system, since the vibration component in synchronism with the rotation of the disk becomes sufficiently small. As a consequence, the control systems can be smoothly changed, the settling vibration until the magnetic head is positioned to the target track can be reduced and also the settling time can be shortened, so that high-speed data access operation can be realized with high density.

Furthermore, since it is not necessary to increase the surface machining precision of the magnetic disk substrate to a maximum limit value, the magnetic disk substrate can be manufactured with low cost.

Moreover, since the vibration amplitude of the position signal never exceeds the specification value during the check stage after the positioning signal has been written it can be avoided in such a manner that the magnetic disk is changed for the data rewriting purpose. As a consequence, the manufacturing efficiency of the magnetic disk can be considerably improved

We claim:

1. A method for writing a magnetic-head positioning signal used in a magnetic disk apparatus wherein a head positioning signal is written into a magnetic disk; the written positioning signal is read out; the read positioning signal is demodulated to produce a position signal; and a data write/read head is positioned to a predetermined track based upon the produced position signal, comprising the steps of:

writing the head positioning signal to write tracks adjacent to each other along a radial direction of the magnetic disk;
   reading out the head positioning signal written in said adjoining write tracks by tracing a read track bridging the write tracks adjacent to each other along the radial direction of the magnetic disk;
   producing a positioning error of the head positioning signal proportioned to a shift of said read positioning signal with respect to the read track; and,
   rewriting a head positioning signal to cancel said positioning error of said head positioning signal.

2. A magnetic head positioning-signal write apparatus wherein a head positioning signal is written on a magnetic disk, the written positioning signal is read from the magnetic, the read positioning signal ia demodulated to produce a position signal, and a data write/read head is positioned to a predetermined track based upon the produced position signal, wherein said data write/read head includes a data read head and a data write head mounted on a same slider and positioned on a same surface of said magnetic disk, said apparatus comprising:

first means for reading the positioning signal written on the magnetic disk by using said data read head to measure a positioning error contained in said read positioning signal; and
   second means for rewriting a positioning signal on the magnetic disk by using said data write head, while controlling the positioning error measured by said first means.

3. A magnetic head positioning-signal write apparatus as claimed in claim 2, wherein said first means includes a magnetic head positioning-signal read head for reading said magnetic head positioning signal by tracing said magnetic head positioning signal written into each of the write tracks adjacent to each other along the radial direction of the magnetic disk, over a read track overlapped on said adjoining write tracks; a head drive system for driving said read head; and a calculating device for producing the positioning error by a read signal output of a magnetic head positioning signal read out from the read track, and for producing a correction value used to cancel said positioning error; and, said second means includes a magnetic head positioning-signal write head for rewriting the magnetic head positioning signal by shifting a write position along a radial direction with respect to said write track based on the correction value of said calculating device.

4. A magnetic head positioning-signal write apparatus as claimed in claim 3, wherein said magnetic head positioning-signal write head includes a means for moving a head slider part of said write head in accordance with said correction value along the radial direction of the magnetic disk.

5. A magnetic head positioning-signal write apparatus as claimed in claim 4, wherein said moving means includes a piezoelectric element as a drive source for moving the head slide part of said write head along the radial direction of the magnetic disk.

6. A magnetic head positioning-signal write apparatus as claimed in claim 4, wherein said moving means includes a shape memory alloy as a drive source for moving the head slider part of said write head along the radial direction of the magnetic disk.

7. A magnetic head positioning-signal write apparatus as claimed in claim 4, wherein said moving means includes a bellows a drive source for moving the head slider part of said write head along the radial direction of the magnetic disk.

8. A magnetic head positioning-signal write apparatus wherein a head positioning signal is written on a magnetic disk, the written positioning signal is read from the magnetic disk, the read positioning signal is demodulated to produce a position signal, and a data write/read head is positioned to a predetermined track based upon the produced position signal, comprising:

first means for reading the positioning signal written on the magnetic disk to measure a positioning error contained in said read positioning signal; and second means for rewriting a positioning signal on the magnetic disk, while controlling the positing error measured by said first means;

wherein said first means includes a magnetic head positioning-signal read head for reading said magnetic head positioning signal by tracing said magnetic head positioning signal written into each of the write tracks adjacent to each other along the radial direction of the magnetic disk, over a read track overlapped on said adjoining write tracks; a head drive system for driving said read head; and a calculating device for producing the positioning error by a read signal output of a magnetic head positioning signal read out from the read track, and for producing a correction value used to cancel said positioning error; and wherein said second means includes a magnetic head positioning-signal write head for rewriting the magnetic head positioning signal by shifting a write position along a radial direction with respect to said write track based on the correction value of said calculating device.

9. A magnetic head positioning-signal write apparatus as claimed in claim 8, wherein said magnetic head positioning-signal write head includes a means for moving a head slider part of said write head in accordance with said correction value along the radial direction of the magnetic disk.

10. A magnetic head positioning-signal write apparatus as claimed in claim 9, wherein said moving means includes a piezoelectric element as a drive source for moving the head slider part of said write head along the radial direction of the magnetic disk.

11. A magnetic head positioning-signal write apparatus as claimed in claim 9, wherein said moving means includes a shape memory alloy as a drive source for moving the head slider part of said write head along the radial direction of the magnetic disk.

12. A magnetic head positioning-signal write apparatus as claimed in claim 9, wherein said moving means includes a bellows as a drive source for moving the head slider part of said write head along the radial direction of the magnetic disk.

13. A magnetic disk apparatus for recording data on a magnetic disk and reproducing data from said magnetic disk, said apparatus comprising:

means for writing a head positioning signal on the magnetic disk;

means for reading the written positioning signal from the magnetic disk;

means for demodulating the read positioning signal to produce a head position signal;

means for positioning a data write/read head to a predetermined track base upon the produced head position signal;

means for writing the head positioning signal on tracks of the magnetic disk adjacent to each other along a radical direction of said magnetic disk, the head positioning signal written in said adjoining write tracks by tracing a read track bridging the write tracks adjacent to each other along the radical direction of the magnetic disk to produce a positioning error of the head positioning signal proportional to a shift of said read positioning signal with respect to the read track, thereby rewriting the head positioning signal to cancel said positioning error of said head positioning signal.

* * * * *

UNITED STATES PATENT AND TRADEMARK OFFICE
CERTIFICATE OF CORRECTION

PATENT NO.  :  5,325,245  Page 1 of 4

DATED  :  28 June 1994

INVENTOR(S)  :  Jyousei SHIMIZU et al.

It is certified that error appears in the above-indentified patent and that said Letters Patent is hereby corrected as shown below:

IN THE ABSTRACT, line 5: Change "responses" to --response--.

| Column | Line | |
|---|---|---|
| 1 | 28 | After "and" delete "then". |
| 1 | 40 | After "detail" insert --.--. |
| 2 | 1 | Change "(on ...) to --(that i... on...)--; delete "this is". |
| 2 | 18 | After "signals" insert --.--. |
| 2 | 49 | After "measured" insert --.--. |
| 2 | 53 | After "thereto" insert --.--. |
| 2 | 60 | After "improved" insert --.-- |
| 2 | 65 | After "data" insert --.--. |

UNITED STATES PATENT AND TRADEMARK OFFICE
CERTIFICATE OF CORRECTION

PATENT NO. : 5,325,245

DATED : 28 June 1994

INVENTOR(S) : Jyousei SHIMIZU et al.

It is certified that error appears in the above-indentified patent and that said Letters Patent is hereby corrected as shown below:

| Column | Line | |
|---|---|---|
| 5 | 11-12 | Change "DESCRIPTION OF THE PREFERRED EMBODIMENTS" to --DETAILED DESCRIPTION--. |
| 5 | 26 | After "disks" delete "is". |
| 6 | 11 | Change "with write" to --as follows. Write--. |
| 6 | 20 | After "Also" delete ",". |
| 6 | 21 | Change "FIG. 4, a" to --FIG. 4 are a--. |
| 6 | 24 | After "units" insert --.--; |
| 6 | 26 | Delete "this". |
| 6 | 35 | Change "amount piezoelectric" to --amount. A piezoelectric--. |

UNITED STATES PATENT AND TRADEMARK OFFICE
CERTIFICATE OF CORRECTION

PATENT NO. : 5,325,245          Page 3 of 4
DATED : 28 June 1994
INVENTOR(S) : Jyousei SHIMIZU et al.

It is certified that error appears in the above-indentified patent and that said Letters Patent is hereby corrected as shown below:

| Column | Line | |
|---|---|---|
| 6 | 62 | Change "unit 23" to --unit 29--. |
| 7 | 46 | Change "rotation synchronized" to --rotation-synchronized--. |
| 8 | 6 | after "canceled" insert a --.--; |
| 8 | 9 | After "R1" insert --,--. |
| 8 | 30 | After "Next," delete --t--. |
| 8 | 68 | After "element" insert --,--. |
| 9 | 22 | Change "illustrates" to --illustrate--. |
| 9 | 25 | Delete "such". |
| 9 | 34 | Change "as" to --is-- |

UNITED STATES PATENT AND TRADEMARK OFFICE
CERTIFICATE OF CORRECTION

PATENT NO.   :   5,325,245

DATED   :   28 June 1994

INVENTOR(S)   :   Jyousei SHIMIZU et al.

It is certified that error appears in the above-indentified patent and that said Letters Patent is hereby corrected as shown below:

| Column | Line | |
|---|---|---|
| 9 | 48 | Delete "such". |
| 10 | 18 | After "written" insert --,--. |
| 10 | 46 | After "magnetic" insert --disk--. |
| 11 | 31 | After "bellows" insert --as--. |
| 11 | 45 | Change "positing" to --positioning--. |
| 12 | 42 | Change "base" to --based--. |
| 12 | 46 | Change "radical" to --radial--. |

Signed and Sealed this

Twenty-ninth Day of November, 1994

BRUCE LEHMAN

Attest:

*Attesting Officer*   *Commissioner of Patents and Trademarks*